Figure 1:
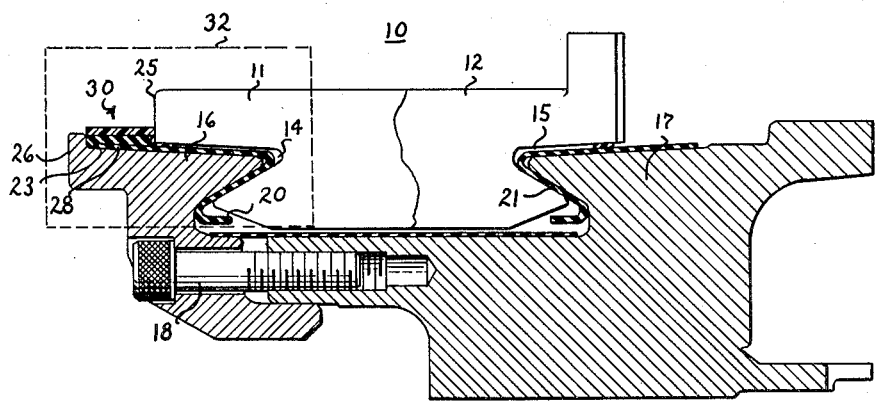

June 29, 1965     S. P. JONES     3,192,424

STRING BAND INSULATION SYSTEM FOR COMMUTATORS

Filed May 13, 1963

INVENTOR.
SAMUEL P. JONES
BY *Joseph V. Claeys*
HIS ATTORNEY

3,192,424
STRING BAND INSULATION SYSTEM FOR COMMUTATORS

Samuel P. Jones, Lawrence Park, Pa., assignor to General Electric Company, a corporation of New York
Filed May 13, 1963, Ser. No. 280,052
10 Claims. (Cl. 310—236)

This invention relates to commutator assemblies for dynamoelectric machines and more particularly to such commutator assemblies which are highly resistant to arc or flashover damage.

In commutators, such as those of the V-ring, arch-bound type, used in dynamoelectric machines, such as motors and generators, a covering must be applied over the V-ring insulation to protect this insulation from the effects of windage and centrifugal force. Since the means most widely employed for this purpose heretofore has been a covering of cotton string to provide the required mechanical strength with a resin coating thereon to bond the string to the extending insulation and provide a relatively smooth surface, this covering has become well known in the art as a commutator "string band." For simplicity of explanation, therefore, the terms "string band" and "string band region" are intended to describe, respectively, the extending insulation protection and the region defined by the end of the commutator clamping V-ring or other support and the ends of the commutator segments.

Since this string band is located between the end of the commutator V-ring, or other support which is at ground potential, and the ends of the commutator segments, which are at a high potential with respect to ground, it is exposed to severe high current arcs and flashovers which take place between the commutator surface and ground.

Although this invention is applicable to commutators for all types of dynamoelectric machines it is particularly advantageous for commutators for use in traction motors and will be particularly described hereafter in that connection.

In spite of the many known disadvantages of the conventional cotton string-resin type string band and the many prior art attempts to overcome these disadvantages, this type of insulation protection has continued to be the most widely utilized. As a result, the problem of protecting traction motor commutator string band from arc or flashover damage has long plagued the prior art. Since in the course of normal duty, traction motors are subjected to extremely dirty operating atmospheres they are highly susceptible to severe high current arcs and flashovers. This is due, in part at least, to the oil, grime and other foreign matter which collects inside the motor and the various parts thereof during normal operation.

It has long been known that the major cause of damage to the commutator string band has been due to the arcs and flashovers between the commutator segments and the end of the commutator V-ring or other support which is at ground potential. Such arcs either permanently destroy the covering by erosion or severely damage it by causing low resistance leakage paths to be established thereacross. These low resistance leakage paths or "tracks" are caused by the carbonized material on the string band covering resulting from its exposure to the severe high current arc. Ideally, therefore, the commutator string band should present a smooth surface which is resistant to the collection of contaminants from the operating atmosphere, provide sufficient mechanical strength to protect the insulation from the effects of windage and centrifugal force, be capable of withstanding the severe, high current arcs and flashovers without being damaged or destroyed and be resistant to the establishment of low resistance leakage paths when exposed to such arcs.

In my U.S. Patent 2,897,386 there was described and claimed a high voltage insulating member having an exposed surface subject to high current arcs or flashovers which had a coating or outer surface comprising polytetrafluoroethylene or polytrifluorochloroethylene. It was disclosed therein that this material had the property of being self-cleaning when exposed to a high current flashover. The heat of the breakdown arc vaporizes a thin layer of the coating, thus exposing a clean new surface instead of leaving a carbonized deposit. A surface exposed to the collection of oil, grime or other foreign matter which would tend to decrease the leakage resistance and increase the likelihood of a flashover could thus be rendered essentially self-cleaning by the action of the flashover arc.

These characteristics of polytetrafluoroethylene and polytrifluorochloroethylene were, therefore, known to be likewise desirable in a string band for dynamoelectric machines subjected to the same type of environment and operating conditions. However, prior to my present invention, no one had been able to make effective use of these materials to solve the problems associated with the commutator string band in dynamoelectric machines.

It is an object of this invention, therefore, to provide a commutator string band insulation which achieves all of the above desideratum and which is substantially self-cleaning when exposed to a high current arc or flashover.

It is another object of this invention to provide a commutator for use in dynamoelectric machines, and particularly for use in traction motors, which is highly resistant to damage from arcs and flashovers encountered during operation.

It is a further object of this invention to provide a method of making commutators for dynamoelectric machines which are resistant to arc or flashover damage.

Briefly stated, in accordance with one aspect of this invention, an improved commutator for a dynamoelectric machine includes an insulation system for the string band region thereof which comprises a substratum including laminae of a fibrous material disposed over the extending ends of the insulation in the commutator string band region. The substratum is arranged to provide sufficient mechanical strength to protect the insulation from the effects of operational windage and centrifugal force. An outer surface layer at least about 0.025 inch thick of polytetrafluoroethylene, polytrifluorochloroethylene, or a copolymer of tetrafluoroethylene and hexafluoropropylene is provided in intimate bonded contact to the substratum to provide a unitary system.

Figure 2:
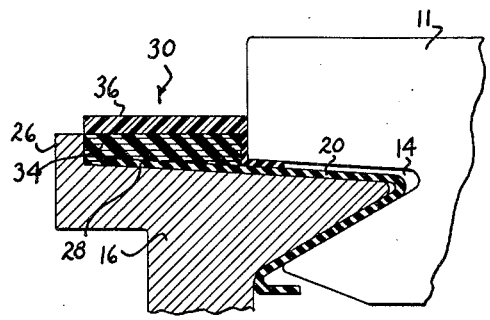

The novel features believed characteristic of this invention are set forth with particularity in the appended claims. The invention itself, however, together with further objects and advantages thereof may best be understood by reference to the following description taken in conjunction with the accompanying drawing in which:

FIG. 1 is a vertical sectional view of a V-ring, arch-bound commutator assembly incorporating this invention; and FIG. 2 is a greatly enlarged view of the portion of the commutator assembly shown in the dashed box in FIG. 1.

As shown in FIG. 1 the commutator assembly 10 incorporating this invention comprises a plurality of copper commutator segments 11 separated by segments 12 of mica or other suitable insulating material. Both the commutator segments 11 and the insulating segments 12 are provided with V-grooves 14 and 15 on their ends which are insulatingly engaged by V-rings 16 and 17. V-rings 16 and 17 are held together in clamping engagement, such as by a bolt 18 or other suitable means, to provide the well known V-ring, arch-bound type of commutator assembly.

As is common practice in commutators of this type the V-grooves 14 and 15 are provided with an arch-binding inner surface inclined at an angle of about 30 degrees and an outer surface inclined at an angle of about 3 degrees. The V-rings 16 and 17 have conical surfaces inclined at the same angles as the surfaces of the V-grooves with which they are adapted to engage. Insulation is provided between the commutator segments and the clamping V-rings by insulating V-rings 20 and 21 usually of mica sheet material.

The outer clamping V-ring 16 has an outer conical surface 23 which extends from the surface of V-groove 14 beyond the ends 25 of commutator segments 11 and terminates in the annular portion 26. The associated insulating V-ring 20 also has an extending portion 28 which extends outwardly to a distance near the end 25 of V-ring 16. It is this space 30 defined by the end 26 of V-ring 16 and the ends 25 of the commutator segments 11, which is termed throughout the specification and claims as the "string band region" since it was the extending portion 28 of the insulating V-ring which had heretofore been protected against the effects of windage and centrifugal forces by the well known cotton string-resin type of covering.

In accord with the present invention I provide an improved insulation and protection system for the string band region 30 for commutators of dynamoelectric machines which renders such commutators highly resistant to arc or flashover damage. The string band region protection system so provided has the following desirable and long sought for characteristics all of which have never heretofore been achieved in the prior art:

(1) A smooth easily cleaned outer surface which is resistant to the collection of contaminants from the operating atmosphere such as oil, dirt and grime;

(2) A mechanical strength sufficient to protect the commutator V-ring insulation from the effects of windage and centrifugal force encountered during machine operation;

(3) Capability of withstanding repeated high current arcs and flashovers with minimum erosion and without tracking while presenting an outer surface which is substantially self-cleaning when exposed to such arcs or flashovers; and (4) Capability of achieving all of the foregoing even under the extreme operating conditions encountered in traction motor service, such as for example, highly contaminated atmospheres, operating temperatures in excess of 150 degrees C. and armature rotational speeds such that the centrifugal force at the string band region exceeds 3000$g$ and the surface velocity exceeds 88 feet per second.

The details of the commutator construction of this invention are shown more clearly in FIG. 2 which is a very greatly enlarged view of the portion in the dashed box designated by the reference numeral 32, in FIG. 1. As shown, the string band system comprises an inner substrate portion 34, disposed in the string band region over the extending portion 28 of the V-ring insulation, and an outer layer 36 of a material selected from the group consisting of polytetrafluoroethylene, polytrifluorochloroethylene, and a copolymer of tetrafluoroethylene and hexafluoropropylene bonded intimately thereto; the outer layer 36 having a thickness of at least about 0.025 inch. The polytetrafluoroethylene and the copolymer of tetrafluoroethylene and hexafluoropropylene materials are sold under the tradenames TFE "Teflon" and FEP "Teflon" respectively by the E. I. du Pont de Nemours & Co., while the polytrifluorochloroethylene material is sold under the tradename "Kel-F" by the Minnesota Mining and Manufacturing Co.

The outer layer 36 of the polyfluorocarbons of the foregoing group, although capable of withstanding high centrifugal forces without destruction, such as delamination and the like, is not able to resist stretching when subjected to the high hoop tensile loading encountered during machine operation. For example, the polyfluorocarbon layer 36 does not have a very high tensile strength so that the radial forces acting along its circumference cause an elongation thereof to such an extent that it cannot maintain itself on the string band region. This difficulty is overcome in the string band system of this invention by bonding the outer layer 36 to the substratum 34.

The substratum 34, therefore, provides the dual function of restraining the outer polyfluorocarbon layer 36 which is intimately bonded thereto, as well as protecting and restraining the extending portion 28 of the V-ring insulation. To achieve this end, the substratum 34 must exhibit sufficient tensile strength to overcome the total hoop tensile load due to the combination of the extending portion 28 of the V-ring insulation, the substratum 34 itself, and the outer polyfluorocarbon layer 36. Preferably, the substratum 34 should exhibit a tensile strength of at least 10,000 p.s.i.

The complete string band system of this invention, therefore, has sufficient tensile strength to restrain and protect the extending insulation from the effects of windage and centrifugal force encountered during machine operation while presenting an outer surface of a material which fulfills all of the desired requirements of a string band for dynamoelectric machines with the additional and highly desirable characteristic of being substantially self-cleaning when exposed to high current arcs or flashovers.

The substratum portion 34 may be provided by a lamina of any suitable fibrous material such as cotton, rayon, glass, or the like, suitably disposed over the extending portion 28 to provide the required tensile strength to protect and restrain the extending portion 28 of the insulating V-ring and the outer layer 36. In combination with the laminae of fibrous material is a material capable of providing an intimate bond to the layer 36 of polytetrafluoroethylene, polytrifluorochloroethylene, or a copolymer of tetrafluoroethylene and hexafluoropropylene. The material must provide a bond between the substratum 34 and the outer layer 36 which has sufficient tensile strength to restrain the layer 36 against the stresses caused by the centrifugal forces encountered during machine operation. Materials suitable for providing such an intimate bond between the substratum and a suitably modified surface of the outer polyfluorocarbon layer 36 are, for example, epoxy and polyester resins and mixtures thereof. For traction motor applications the preferred materials have been found to be those selected from the group consisting of bisphenol-epichlorohydrin polymers, epoxylated novalak polymers, polyester polymers, and mixtures thereof. More specifically, for such applications the substratum and the material used in combination therewith must provide a bonded unitary structure with sufficient tensile strength to restrain the extending portion of the insulation and the outer polyfluorocarbon layer 36 from the stresses due to these centrifugal forces for conditions when the machine is operating at the highest rotational speed and the highest operating temperature at the same time. Preferably, therefore, traction motor applications, the outer layer 36 should be so bonded to the substratum that the joint has a tensile strength of at least about 400 p.s.i at 160 degrees C.

Materials for forming the substratum which have been found suitable for purposes of this invention are cotton, rayon or glass tape impregnated with an epoxy resin, such as a bisphenol-epichlorohydrin polymer. Preferably, the substratum is formed from a unidirectional glass tape, impregnated with an uncured epoxy resin such as, for example, a unidirectional glass tape impregnated with a bisphenol-epichlorohydrin polymer containing no solvent. A suitable tape of this type is sold under the tradename "Scotch-Ply" by the Minnesota Mining and Manufacturing Company.

Another suitable substratum material is roving, such as that described in U.S. Patent 2,747,119. Such roving is formed of a fibrous material, and preferably of the continuous filament, loosely constructed, substantially parallel glass fibers, impregnated with a thermosetting resinous material, such as that described in U.S. Patent 2,528,235.

Alternatively, the substratum may be formed from unimpregnated cotton, rayon, glass, or other suitable fibrous material which is thereafter impregnated and coated with a suitable thermosetting resinous material and cured. Thereafter a layer of bonding material may be applied to the cured resinous surface of the substratum which bonding material is capable of providing an intimate bond of the required strength between the substratum and the particular polyfluorocarbon outer layer 36.

In constructing a commutator in accordance with one aspect of this invention, therfore, the substratum portion 34 is first formed. To this end a suitably impregnated, unidirectional glass tape such as that sold under the tradename "Scotch-Ply" by the Minnesota Mining and Manufacturing Company, or a suitably impregnated tape of other suitable fibrous substratum material, is wrapped over the extending portion 28 of insulating V-ring 20. Since the string band region 30 has a conical surface it is preferred to continue wrapping the tape, in addition to the amount that is required for mechanical strength, in a manner which will assure that the outer surface of the substratum is substantially cylindrical rather than following the conical contour of the outer surface of the V-ring. This assures a uniform contact between the substratum surface and the surface of the layer of polytetrafluoroethylene, polytrifluorochloroethylene, or a copolymer of tetrafluoroethylene and hexafluoropropylene which must be bonded thereto. The polyfluorocarbon layer 36 is then applied over the outer surface of the substratum and bonded thereto. This outer layer may be in the form of a tape at least about 0.025 inch thick having the surface which is to contact the substratum surface suitably modified to a sure and intimate bond thereto. For example, this surface may be suitably modified by subjecting it to a well known sodium treatment such as by immersing it in a solution of sodium metal in liquid anhydrous ammonia to render it bondable with adhesives. Details of other known modifying treatments suitable for this purpose may be had by reference to an article entitled "Treatment of Teflon to Promote Bondability" by Asaf A. Benderly in the Journal of Applied Polymer Science, volume VI, issue No. 20, pages 221–225.

When such a tape is employed the ends do not overlap but instead terminate in a closely fitting butt-type joint. Preferably, the outer layer 36 of polytetrafluoroethylene, polytrifluorochloroethylene, or a copolymer of tetrafluoroethylene and hexafluoropropylene is in the form of a molded ring, at least about 0.025 inch thick, having an inside diameter slightly smaller than the diameter of the substratum. The inside surface of the molded ring is suitably modified as described above to assure an intimate bond to the substratum. The molded ring is heated to a temperature in the range of about 175 degrees C. to 200 degrees C. prior to being applied to the substratum surface to make it more flexible and elastic. The heated molded ring is then applied to the commutator string band region by forcing it axially over the end of the V-ring and on to the surface of the substrate. This heating allows the ring to stretch more easily over the end of the V-ring and the substratum without damage and provides intimate contact between its modified inner surface and the resin-rich impregnated surface of the substratum.

Alternatively, the ring of polytetrafluoroethylene, polytrifluorochloroethylene, or a copolymer of tetrafluoroethylene and hexafluoropropylene may be molded with a conical inner surface. When such a molded ring is employed the fibrous material forming the substratum may be wrapped over the extending portion 28 of the insulating V-ring 20 in a quantity sufficient to provide the required tensile strength while following the conical contour of the V-ring surface. The inside conical surface of the molded ring will then be in intimate contact with the outer conical surface of the substratum when the ring is forced axially over the end of the commutator V-ring and provide the required intimate bond thereto.

After the outer polyfluorocarbon layer 36 has been applied over the substratum in the string band region in the manner set forth, the entire commutator assembly is subjected to heat to cure the bonding material and provide the required intimate bond therebetween. This curing treatment depends upon the particular type of bonding material employed. For example, when the substratum has been prepared from an epoxy resin-impregnated-unidirectional glass tape wherein the impregnating resin is a bisphenolepichlorohydrin polymer together with a curing agent such as the borontrifluoride-ethylamine complex, the curing may be accomplished by baking the commutator assembly for about eight hours at a temperature in the range of about 120 degrees C. to 135 degrees C.

Alternatively, the impregnated fibrous material of the substratum may be cured prior to the application thereto of the polyfluorocarbon layer 36. In such case the layer 36 is bonded to the cured surface of the substratum 34 with an additional coating of bonding material which is thereafter suitably cured. The bond may be provided, for example, by application to the cured substratum surface of a coating of epoxy or polyester resin or a mixture thereof. More specifically, the coating may be a resin-catalyst mixture wherein the resin is an epoxy or polyester polymer or a mixture thereof. Further, the resin may be a thermosetting resinous material selected from the group consisting of bisphenol-epichlorohydrin polymers, epoxylated novalak polymers, polyester polymers and mixtures thereof. The polyfluorocarbon layer 36 is then applied to the coated surface of the substratum and the assembly subjected to a suitable cure.

While I have described particular embodiments of my invention it will be apparent to those skilled in the art that changes and modifications may be made without departing from my invention in its broader aspects and I intend, in the appended claims, to cover all such changes and modifications as fall within the true spirit and scope of my invention.

What I claim as new and desire to secure by Letters Patent of the United States is:

1. In combination with a commutator, an insulation system for the string band region thereof which comprises: a substratum of a fibrous material disposed over the extending insulation in said string band region; and an outer surface layer having a thickness of at least about 0.025 inch intimately bonded to said substratum and selected from the group consisting of polytetrafluoroethylene, polytrifluorochloroethylene and a copolymer of tetrafluoroethylene and hexafluoro propylene, said substratum being arranged to protect the extending insulation from the effects of windage and centrifugal force and exhibiting sufficient tensile strength to overcome the total hoop tensile load due to the insulation, the substratum itself and the outer surface layer.

2. The combination of claim 1 wherein the substratum exhibits a tensile strength of at least 10,000 p.s.i.

3. The combination of claim 1 wherein said substratum is formed of a plurality of wrappings of a fibrous material impregnated with an uncured thermosetting resinous composition wherein the resin is a polymer selected from the group consisting of bisphenol-epichlorohydrin, epoxylated novalak, polyester and mixtures thereof.

4. The combination of claim 1 wherein said substratum is formed of a unidirectional glass tape impregnated with an uncured bisphenol-epichlorohydrin polymer containing no solvent.

5. The combination of claim 3 wherein the fibrous material of said substratum is glass arranged to provide said substratum with a substantially cylindrical outer surface onto which said outer surface layer is bonded.

6. In combination with a commutator assembly, an insulation system for the string band region thereof which comprises: a plurality of wrappings of a fibrous material over the extending insulation in said string band region to provide a substratum therein having a tensile strength of at least 10,000 p.s.i.; and an outer surface layer of a solid material selected from the group consisting of polytetrafluoroethylene, polytrifluorochloroethylene, and a copolymer of tetrafluoroethylene and hexafluoropropylene, said outer surface layer having a thickness of at least about 0.025 inch and being bonded to said substrate with a bond having a tensile strength of at least about 400 p.s.i. at 160 degrees C.

7. In combination with a commutator assembly, an insulation system for the string band region thereof which comprises: a substratum disposed over the extending insulation in said string band region and having a tensile strength of at least 10,000 p.s.i.; and an outer surface layer of a solid material selected from the group consisting of polytetrafluoroethylene, polytrifluorochloroethylene and a copolymer of tetrafluoroethylene and hexafluoropropylene having a thickness of at least about 0.025 inch bonded to the surface of said substratum with a bond having a tensile strength of at least about 400 p.s.i. at 160 degrees C., said substratum including a plurality of wrappings of a fibrous material impregnated with a thermosetting resinous composition wherein the resin is selected from the group consisting of the bisphenol-epichlorohydrin polymers, the epoxylated novalak polymers, the polyester polymers, and mixtures thereof and being cured to intimately bond said outer surface layer to said substratum to provide a unitary structure.

8. In combination with a commutator assembly, an insulation system for the string band region thereof which comprises: a substratum disposed over the extending insulation in the string band region, said substratum including a plurality of wrappings of a unidirectional glass tape impregnated with an uncured bisphenol-epichlorohydrin polymer-catalyst mixture containing no solvent; and an outer surface layer of a solid material selected from the group consisting of polytetrefluoroethylene, polytrifluorochloroethylene, and a copolymer of tetrafluoroethylene and hexafluoropropylene having a thickness of at least about 0.025 inch bonded intimately to said substratum surface, said unidirectional glass tape being arranged in said string band region to protect the insulation from the effects due to windage and centrifugal force and forming a substratum which exhibits a tensile strength sufficient to overcome the total hoop tensile loading due to said insulation, said substratum itself and said outer surface layer.

9. The combination of claim 8 wherein said outer layer is a tape having a thickness of at least about 0.025 inch bonded intimately to the outer surface of said substratum with the ends of said tape terminating in a closely fitting butt-type joint.

10. The combination of claim 8 wherein said outer layer is a continuous ring having a thickness of at least about 0.025 inch and an inside configuration arranged to conform to the contour of the outside surface of said substratum to effect said intimate bond thereto.

References Cited by the Examiner

Webster's New International Dictionary, 2nd edition, published by G. & C. Merriam, Springfield, Massachusetts, 1958 (Group 240).

MILTON O. HIRSHFIELD, *Primary Examiner.*